UNITED STATES PATENT OFFICE.

EDGAR F. PRICE, OF NIAGARA FALLS, NEW YORK, ASSIGNOR, BY MESNE ASSIGNMENTS, TO CENTRAL TRUST COMPANY, OF NEW YORK, A CORPORATION OF NEW YORK, TRUSTEE.

PROCESS OF OBTAINING NICKEL FROM SILICIOUS ORES.

No. 909,667.　　　Specification of Letters Patent.　　　Patented Jan. 12, 1909.

Application filed July 29, 1907. Serial No. 386,091.

*To all whom it may concern:*

Be it known that I, EDGAR F. PRICE, a citizen of the United States, residing at Niagara Falls, in the county of Niagara and State of New York, have invented certain new and useful Improvements in Processes of Obtaining Nickel from Silicious Ores, of which the following is a specification.

According to this process, a silicious ore of nickel and iron is smelted by means of carbon and an electrically-heated resistance-conductor and the resulting ferro-nickel is treated with an oxidizing agent, preferably air injected into the molten alloy, and an acid flux, preferably silica, to substantially remove the iron. A molten deoxidizer such as silicon, ferro-silicon or aluminum may be added to the high-nickel product before casting it into ingots.

The electric smelting may be effected either in a furnace having a separate carbon resister or in a stack furnace having downwardly-converging walls, in which case the charge may be so proportioned as to constitute it the resistance-conductor when hot, initial current-paths being provided if required. By tapping out the slag and alloy and supplying the ore and carbon at intervals the process may be carried out continuously. A basic flux may be added to slag off the silica, or more or less of the silica may be reduced to give a product low in carbon.

The removal of the iron may be effected in the reduction furnace, provided with tuyers at its lower end for the introduction of streams of air, the alloy being thus electrically heated and maintained in a molten condition by electric heat in addition to that supplied during reduction, if necessary. Silica for slagging the oxidized iron may be derived from the charge, or may be independently added. If the product of reduction contains silicon, the oxidation of this silicon supplies heat to maintain the metal in a molten condition and the resulting silica combines with the iron oxid. If preferred, the ferro-nickel may be tapped out of the reduction furnace into a separate converter, for removal of the iron.

I claim:—

1. The process of producing ferro-nickel, which consists in smelting a charge containing a silicious ore of nickel and iron and carbon by means of an electrically-heated resistance-conductor, withdrawing the slag and product from the furnace and supplying the charge-mixture as required.

2. The process of producing ferro-nickel, which consists in smelting a charge containing a silicious ore of nickel and iron and carbon by passing an electric current through the charge, acting as a resistance-conductor, withdrawing the slag and product from the furnace, and supplying the charge-mixture as required.

3. The process of obtaining nickel, which consists in smelting a mixture of a silicious ore of nickel and iron and carbon by means of an electrically-heated resistance-conductor, thereby producing ferro-nickel, treating the molten ferro-nickel with air and an acid flux to effect the removal of iron, and treating the high-nickel product with a metallic deoxidizing agent.

In testimony whereof, I affix my signature in presence of two witnesses.

EDGAR F. PRICE.

Witnesses:
I. R. EDMONDS,
H. L. NOYES.